(12) United States Patent
Priddle et al.

(10) Patent No.: US 6,647,030 B1
(45) Date of Patent: Nov. 11, 2003

(54) TUNING OF OPTICAL FIBER COMPONENTS

(75) Inventors: Helen F Priddle, Bishops Stortford (GB); Ian A Abraham, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 22 days.

(21) Appl. No.: 09/893,258

(22) Filed: Jun. 27, 2001

(51) Int. Cl.[7] .................................. H01S 3/10
(52) U.S. Cl. ................ 372/20; 372/6; 372/20; 372/31
(58) Field of Search ................. 372/20, 31, 102, 372/103, 96, 6

(56) References Cited

U.S. PATENT DOCUMENTS 4,678,905 A * 7/1987 Phillips ............... 250/227.21
4,897,541 A * 1/1990 Phillips ............... 250/227.21
6,330,383 B1 * 12/2001 Cai et al. ................ 359/130
6,367,335 B1 * 4/2002 Hicks et al. ................ 73/800
6,470,036 B1 * 10/2002 Bailey et al. ............... 372/20

* cited by examiner

Primary Examiner—Paul Ip
Assistant Examiner—Delma R. Flores Ruiz
(74) Attorney, Agent, or Firm—Barnes & Thornburg

(57) ABSTRACT

A tuning element tunes an optical component by adjusting the length of an optical fiber used within the optical component. Changes in length of a piezoelectric element are amplified by a surround structure, and the surround is provided with optical fiber fixing portions. The piezoelectric element is provided with an opening for receiving a fiber, such that a portion of a fiber can pass transversely through the opening, the length of the portion being adjustable by controlling the length of the piezoelectric element. The piezoelectric actuators have a fast response time and provide reliable operation.

20 Claims, 5 Drawing Sheets

TUNING OF OPTICAL FIBER COMPONENTS

FIELD OF THE INVENTION

This invention relates to tuning of optical fiber components, and in particular provides a tuning element as well as an optical component provided with such a tuning element.

BACKGROUND OF THE INVENTION

Various optical fiber components are known for use within optical fiber communication systems, and in particular for overcoming various distortions which arise as an optical signal is transmitted along a fiber span. For example, the use of Bragg reflection gratings is known for causing wavelength-dependent delays, which compensate for dispersion effects.

Many optical materials exhibit different responses to optical signals of different wavelengths. Chromatic dispersion, often simply referred to as "dispersion", is one well-known resulting phenomenon, in which the index of the refraction of a medium is dependent on the wavelength of an optical wave. Dispersion can cause optical waves of different wavelengths to travel at different speeds in a given medium, since the speed of light is dependent on the index of refraction. The dispersion of optical materials in general relates nonlinearly to the wavelength.

In many applications, an optical signal is composed of spectral components of different wavelengths. For example, a single-frequency optical carrier may be modulated in order to impose information on the carrier. Such modulation generates modulation sidebands at different frequencies from the carrier frequency. Also, optical pulses, which are widely used in optical data processing and communication applications, contain spectral components in a certain spectral range. The dispersion effect may cause adverse effects on the signal due to the different delays on the different spectral components.

Dispersion in particular presents obstacles to increasing system data rates and transmission distances without signal repeaters in either single-channel or wavelength-division-multiplexed ("WDM") fiber communication systems. Data transmission rates of tens of Gbit/s may be needed in order to meet the increasing demand in the marketplace. Dispersion can be accumulated over distance to induce pulse broadening or spread. Two adjacent pulses in a pulse train thus may overlap with each other at a high data rate due to dispersion. Such pulse overlapping can often cause errors in data transmission.

There have been various proposals for overcoming the dispersion effect, including use of a Bragg grating. Such gratings are known both with linearly chirped (i.e. varying) grating periods and with non-linearly chirped grating periods, in order to achieve the desired spectral response along the length of the optical carrier (fiber or waveguide).

A spectral component in an optical signal having the Bragg wavelength is reflected back from a Bragg grating. Other spectral components are transmitted through the grating. The Bragg wavelengths at different positions in the fiber grating are differentiated by the chirping of the grating period, so that the Bragg wavelength of the fiber grating changes with the position. As the grating period increases or decreases along a direction in the fiber grating, the Bragg wavelength increases or decreases accordingly. Therefore, different spectral components in an optical signal are reflected back at different locations and have different delays. Such wavelength-dependent delays can be used to negate the accumulated dispersion in a fiber or waveguide link.

To use a chirped Bragg grating, an optical circulator is typically used to couple the input optical signal to the grating and to route the reflected signal. An optional optical isolator or anti-reflection termination may be placed at the other end of the grating to reject any optical feedback signal.

To provide a tuneable fiber grating, it is necessary to alter the chirp of the grating. Known methods for providing tuning of Bragg gratings within optical components rely upon mechanical, thermal or thermo-mechanical arrangements. These techniques have relatively slow response times, high power dissipation and may also suffer from reliability problems.

SUMMARY OF THE INVENTION

According to the invention, there is provided a tuning element for tuning an optical component by adjusting the length of an optical fiber used within the optical component, the tuning element comprising;

an elongate piezoelectric element, the length of the piezoelectric element being controllable by applied control signals; and a surround around the piezoelectric element and contacting the ends of the piezoelectric element, wherein the surround has a width, transverse to the longitudinal axis of the piezoelectric element, which varies when the length of the piezoelectric element is varied thereby amplifying changes in length of the piezoelectric element, wherein opposite sides of the surround are provided with an optical fiber fixing portion, and the piezoelectric element is provided with an opening for receiving a fiber, such that a portion of a fiber can pass transversely through the opening, the length of the portion being adjustable by controlling the length of the piezoelectric element.

The arrangement of the invention uses piezoelectric actuators, which have a fast response time and provide reliable operation. The use of a surround around a piezoelectric element, so that changes in length of the element are converted into changes in width of the surround, results in amplification of the change in dimension of the piezoelectric element.

Each optical fiber fixing portion may comprise a tube through which the fiber can pass, with one end of the tube contacting the surround and the other end of the tube being connected to the fiber. This enables the length of the fiber being stretched by the tuning element to be different to the width of the surround. Thus, the tuning element can be designed simply to provide the required change in length of the fiber, and the optical fiber fixing portion enable this change in length to be provided to the desired length of fiber.

The tuning element may comprise two elongate piezoelectric elements arranged side by side and parallel to each other, both surrounded by the surround. In this case, the separation between the two piezoelectric elements will be selected in dependence upon the length of the fiber to be stretched by the tuning element.

Each optical fiber fixing portion may be provided for fixing at least two optical fibers. Thus, in an optical component which uses a number of fibers, for example a number of Bragg gratings, which are to be tuned in the same manner, this can be achieved with a single tuning element.

The two optical fiber fixing portions may additionally be arranged such that the length of the two fibers are different, so that different tuning is provided for the two different fibers.

The use of two piezoelectric elements also enables independent control of the tuning of two fibers using the single tuning element. To achieve this, one fiber is connected to one side of the surround and to one of the piezoelectric elements, and the other fiber is connected to the other side of the surround and the other piezoelectric element. Each piezoelectric element results in a change in shape of one side of the surround, and this has an effect only on one of the optical fibers in the tuning element.

To enable easy assembly of the tuning element, the optical fiber fixing portion may comprise a ferrule for attachment to the optical fiber, the ferrules having a narrow portion for engagement in an opening in the surround, and wider portions on each side of the narrow portion which prevent movement of the ferrule through the opening. The ferrule can then be attached to the surround by sliding the narrow portion into a slot in the surround. In addition, the opening in the piezoelectric element may also comprise a slot, so that the optical fiber, with ferrules attached, may simply be slotted into the tuning element during assembly.

The invention also provides a tuneable optical component comprising an optical fiber and a tuning element of the invention.

As described above, the fiber may be fixed to opposite sides of the surround, or alternatively the fiber may be fixed in one position to the surround, and in another position to the piezoelectric element, particularly in the case where two piezoelectric elements are provided and the tuning element is for tuning two fibers simultaneously and independently.

Typically, a Bragg grating is written into the fiber, and the tuning operation then results in a change in the chirp of the Bragg grating. This Bragg grating may form part of a dispersion compensator or a tuneable fiber filter. The tuned fiber may also contain a laser cavity defined by mirror or grating reflectors.

The invention also provides a method of tuning an optical component using the tuning element of the invention.

BRIEF DESCRIPTION OF THE DRAWINGS

Examples of the invention will now be described in detail with reference to the accompanying drawings in which.

DETAILED DESCRIPTION

Figure 1:
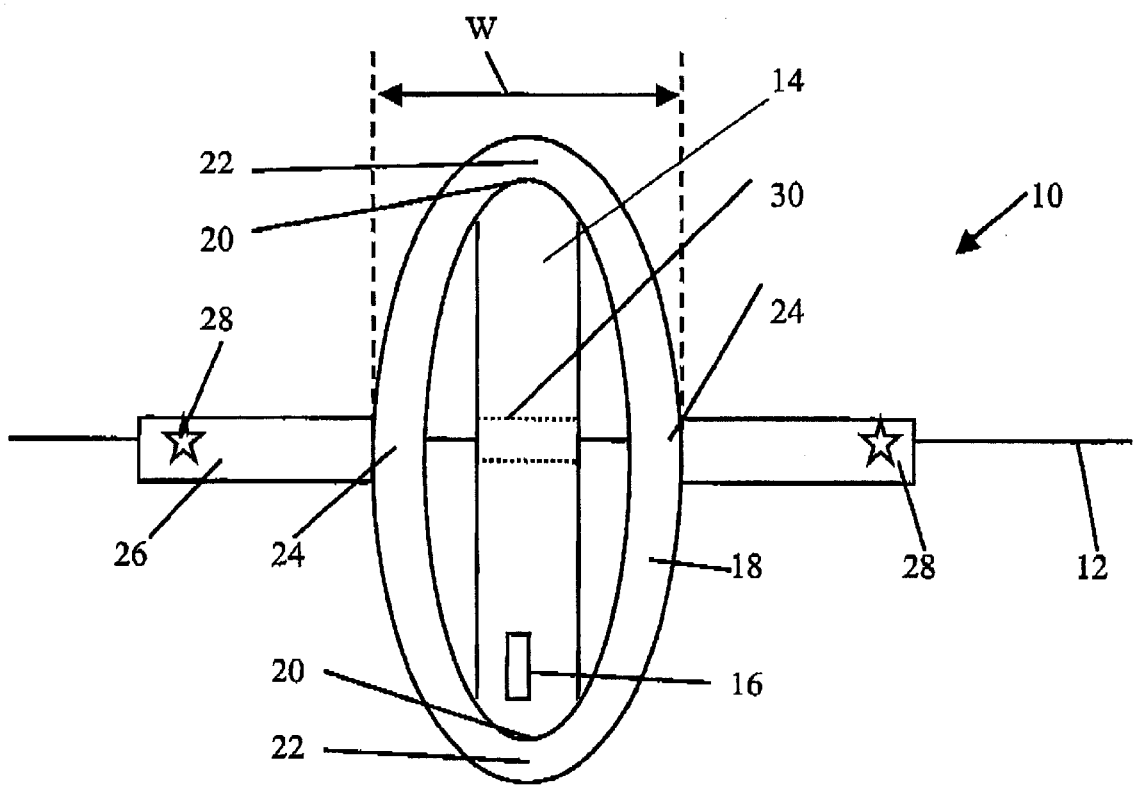
FIG. 1 shows a first example of tuning element according to the invention.

FIG. 1 shows a tuning element 10 of the invention for adjusting the length of an optical fiber 12. The tuning element 10 has a piezoelectric element 14 arranged as an elongate bar. The length of the element 14 is controllable by applying control signals to a terminal 16.

A surround 18 is provided around the element 14 and contacts the ends 20 of the piezoelectric element. The surround 18 is formed from a material which is deformable in such a way that the length of the surround remains substantially constant. Thus, changes in the length of the piezoelectric element 14 result in a change in shape of the surround, giving rise to a different width W. To achieve this, the material of the surround 18 is selected, in particular, with appropriate bending modulus and elastic modulus.

The surround 18 may simply contact the ends 20 of the element 14, and remain in place by the natural bias of the surround 18 towards a shape in which the ends 22 of the surround are closer together. Alternatively, the surround 18 may be fixed to the ends 20 of the piezoelectric element 14.

Opposite sides 24 of the surround 18 are provided with an optical fiber fixing portion 26, so that the fiber 12 extends across the width of the tuning element 10.

In the example shown in FIG. 1, the optical fiber fixing portion 26 comprises a tube through which the fiber passes. The fiber is connected to the tube 26 at locations 28 and is not supported between these points. Thus, the length of a portion of the fiber 12 between the fixing points 28 is to be controlled by the tuning element 10.

The fiber 12 passes through the sides 24 of the surround 18 and also through an opening 30 in the center of the piezoelectric element 14.

The tuning element converts changes in length of the piezoelectric element 14 into changes in width W of the surround 18. These width changes in turn result in movement of the optical fiber fixing portions 26, thereby changing the length of the fiber portion between the fixing points 28. This enables the size of the tuning element 10 to be selected simply as a function of the change in length required for the fiber, rather than the length of the fiber itself.

Typically, the fiber 12 includes a Bragg grating in the portion between the fixing points 28, and the length of the Bragg grating may typically be of the order of 10 cm, whereas the length of the piezoelectric element may be of the order of 5 cm.

Figure 2:
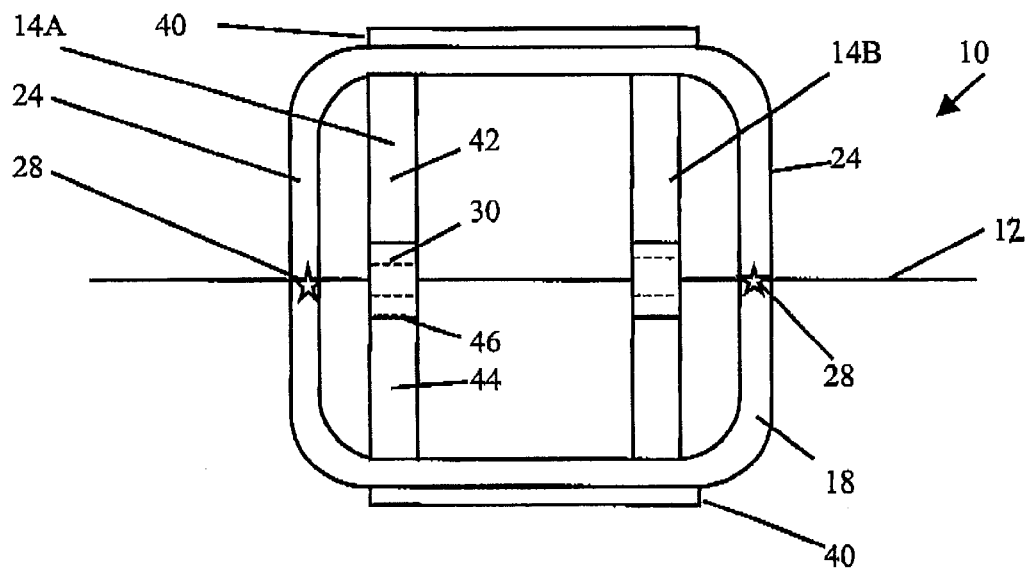
FIG. 2 shows a second example of tuning element of the invention.

FIG. 2 shows a second embodiment of tuning element in which two piezoelectric elements are provided 14A, 14B. The shape of the surround 18 between the elements 14A, 14B is fixed by plates 40 (which are optional and may not be required), so that the change in shape of the surround 18 manifests itself as deformation only of the sides 24. This provides a more mechanically stable design. Furthermore, the centers of the two piezoelectric elements 14A, 14B are stationary during operation of the tuning element. The use of metal spacers at the centers of the elements therefore provide suitable mounting points for the tuning element. In the example shown in FIG. 2, the optical fiber 12 is fixed to opposite sides of the surround 18, again at fixing points 28. The spacing between the two piezoelectric elements 14A, 14B can in this case be designed in dependence upon the length of the fiber portion, thereby avoiding the need for the fixing portions 26 shown in FIG. 1.

FIG. 2 also shows that each piezoelectric element 14 nay comprise two sections 42, 44 on either side of a metal spacer 46 which provides the through-hole 30 for the fiber 12.

The tuning element of the invention may be used for controlling the length of two or more optical fibers, simultaneously.

Figure 3:
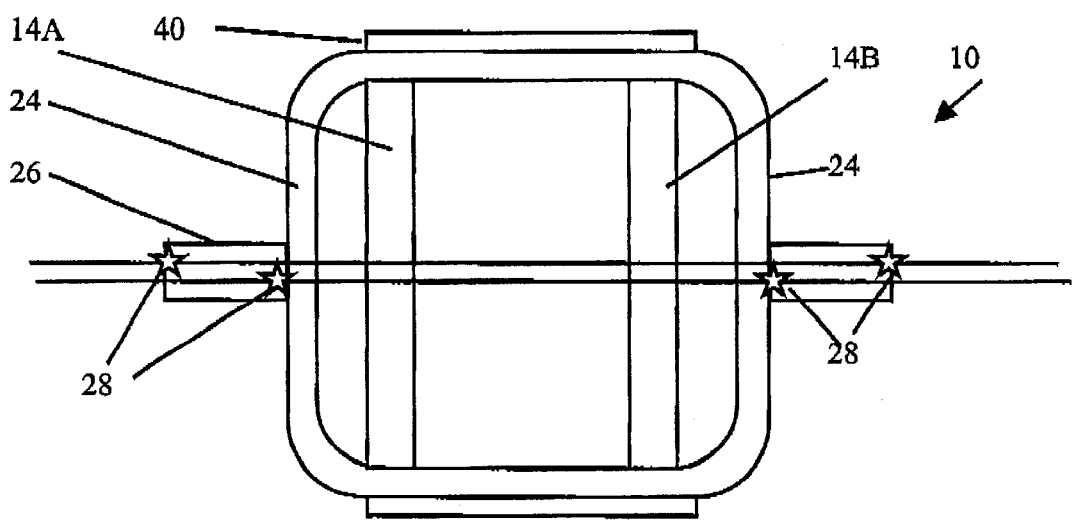
FIG. 3 shows a third example of tuning element of the invention.

In the example shown in FIG. 3, two fibers 12A, 12B pass through the piezoelectric elements 14A, 14B. Control of the tuning element can be arranged to provide different stretching of the two fibers 12A, 12B. In the example of FIG. 3, optical fiber connecting portions 26 are shown in which the connection points of the two fibers are angled, so that the length of the portion of each fiber is different. The connection points of the fibers are again indicated as numeral 28, and FIG. 3 shows schematically how the portion of fiber 12A can be defined to have a greater length than the portion of the fiber 12B. Whilst this arrangement enables the stretching of one fiber to be scaled with respect to the stretching of the other fiber, it does not provide independent control of the fiber lengths.

Figure 4:
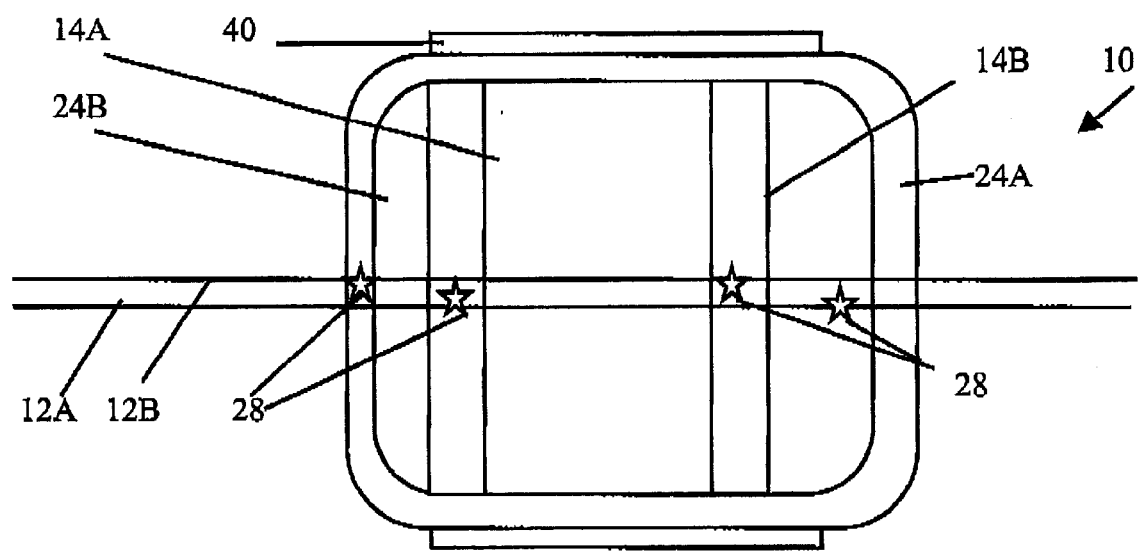
FIG. 4 shows a fourth example of tuning element of the invention.

FIG. 4 shows an arrangement in which independent control of the length of two fibers can be provided. One fiber 12A is connected to one of the piezoelectric elements 14A and to one side 24A of the surround, whereas the other fiber 12B is connected to the other piezoelectric element 14B and to the other side 24B of the surround.

Operation of one piezoelectric element only results in the change in shape in one side of the surround 18. As a result, it is possible to provide independent length control of the two fibers.

Figure 5:
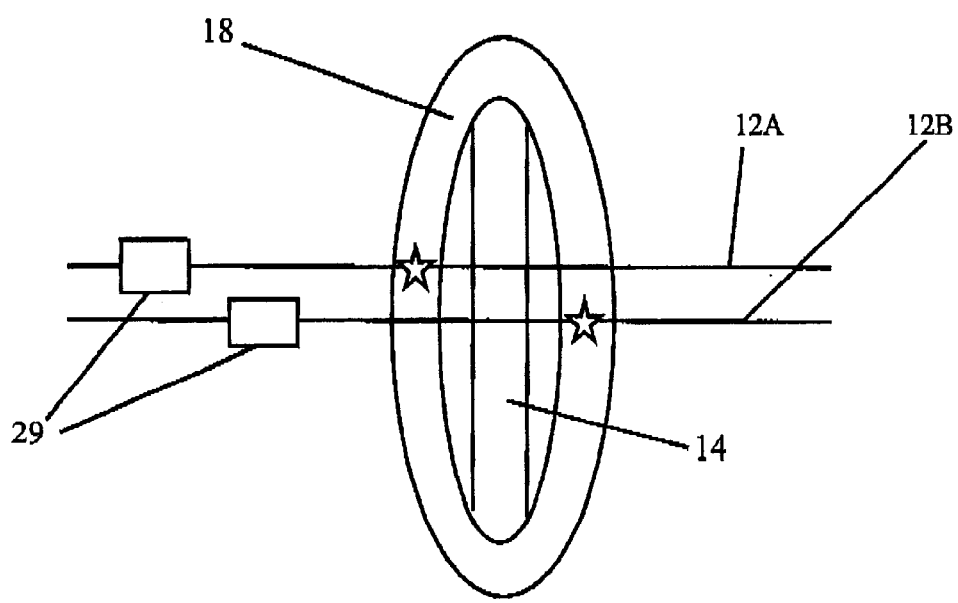
FIG. 5 shows a fifth example of tuning element of the invention.

FIG. 5 shows an arrangement in which a single piezoelectric element 14 provides control of the length of two fibers 12A, 12B in opposite senses. One fiber 12A is connected to one side of the surround 18 and the other fiber 12B is connected to the opposite side of the surround 18. The two fibers are fixed at locations 29 remote from the tuning element. The positions of the locations 29 may provide different lengths of tuned fiber.

The connections 28 of the fibers may be achieved by any known technique. For example, a metallized fiber may simply be soldered to a metal component, or any fiber may be fixed within a passageway using an epoxy adhesive.

To simplify assembly of the tuning element 10, the fiber or fibers may pass through slots rather than openings. Thus, the opening 30 in the or each piezoelectric element 14 may be defined as a slot so that the fiber does not need to be threaded through the piezoelectric element.

Similarly, the openings in the surround 18 may also be defined as slots to simplify assembly.

Figure 6:
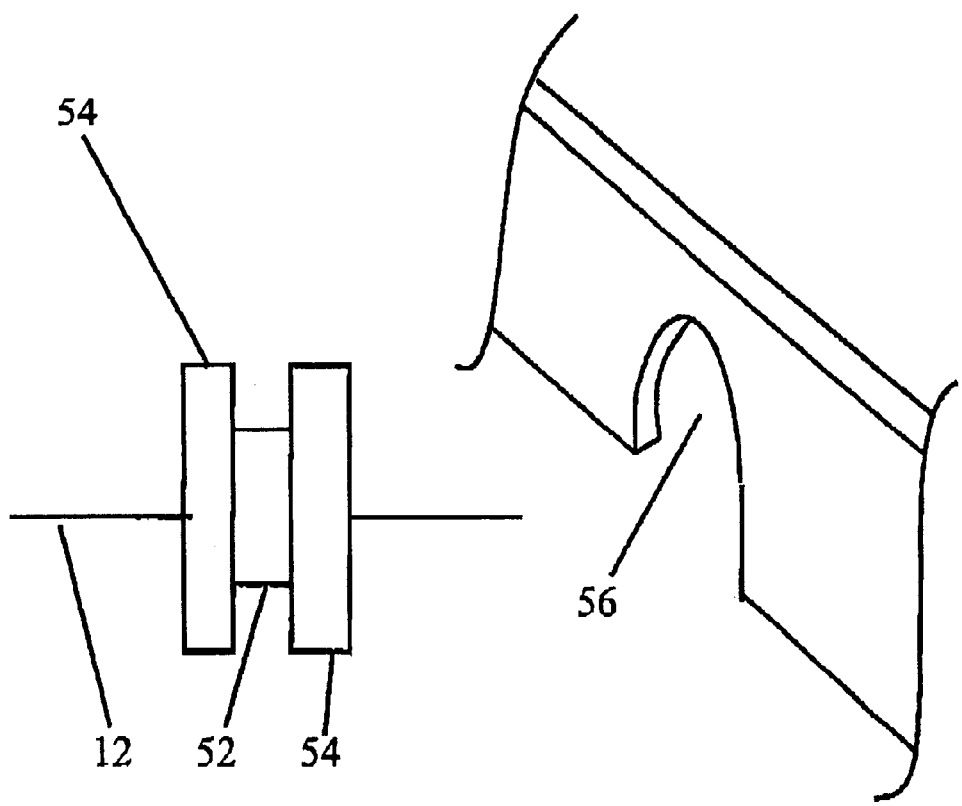
FIG. 6 shows one possible ferrule design for use in the tuning element.

FIG. 6 shows one possible arrangement for providing a point of connection of a fiber to the surround 18 or piezoelectric element 14, as required. A ferrule 50 is mounted around the fiber 12 and is fixed to the fiber, for example using epoxy adhesive. The ferrule 50 has a narrow central portion 52 and two wider end portions 54. When the narrow portion 52 is inserted into a slot 56 provided in the surround 18 or the piezoelectric element 14, the wider portions 54 prevent lateral movement of the fiber.

Figure 7:
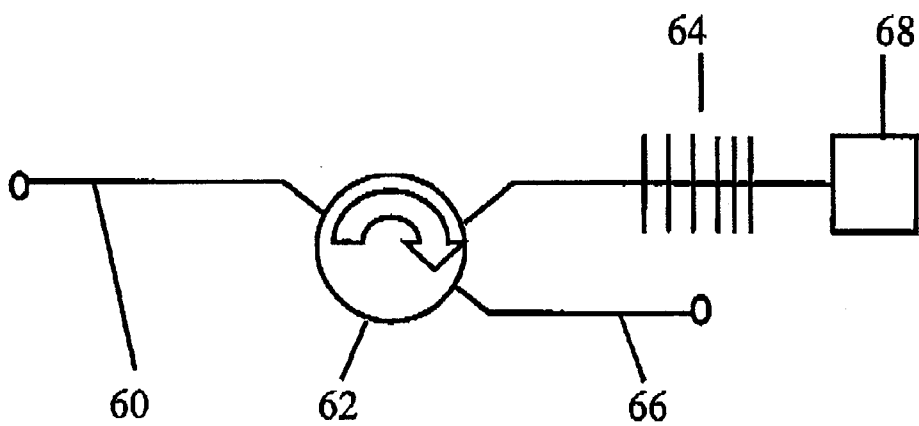
FIG. 7 illustrates schematically the components of a dispersion compensator.

The tuning element of the invention is particularly suitable for adjusting the length of a fiber carrying a Bragg grating. There are numerous optical components in which tuneable Bragg gratings may be required. For example, FIG. 7 shows a tuneable dispersion compensator comprising an input 60, and a circulator 62 which routes the input to a tuneable Bragg grating 64. The Bragg grating 64 reflects signals at different points along its length as a function of wavelength, and these reflected signals are routed to an output 66 of the device. An isolator 68 may also be provided to prevent reflection of unwanted signals at the output of the Bragg grating 64.

Figure 8:
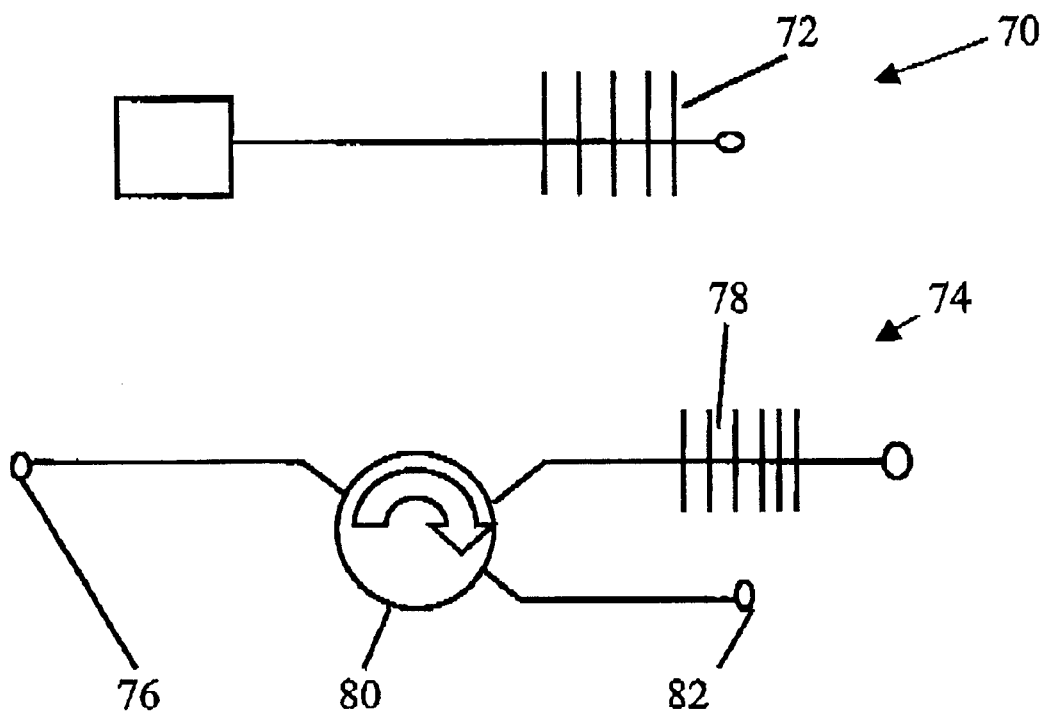
FIG. 8 shows two further possible uses of the tuneable component.

FIG. 8 shows a tuneable fiber laser 70 comprising a grating structure 72 which defines a laser cavity. The fiber laser is a DFB (distributed feedback) fiber laser, and the grating structure 72 may for example comprise two offset and phase shifted gratings. These provide wavelength-selective reflectors at each end of a laser cavity, The grating structure 72 is mounted within the tuning arrangement of the invention. FIG. 8 also shows a filter 74 in which an input 76 is routed to the tuneable Bragg grating 78 by a circulator 80. The Bragg grating 78 is tuned to allow the passage of most wavelengths with low attenuation, but reflects the wavelengths to which the filter is tuned, which are in turn routed by the circulator 80 to port 82.

Various modifications will be apparent to those skilled in the art.

We claim:

1. A tuning device for an optical component comprising:
   a piezoelectric member having generally oppositely facing end faces and oppositely facing side faces extending between said end faces;
   an element surrounding the piezoelectric member contacting with said end faces of said member but not contacting with said side faces of said member; and
   a fixing portion for an optical fiber to be mounted on the surround element, said portion being located on said element at a point where it is not in contact with said member,
   wherein the surround element has a width, perpendicular to the longitudinal axis of the piezoelectric member,
   whereby the width of the surround element varies if the length of said piezoelectric member is varied and the resultant change in width of said surround element is greater than the change in length of said piezoelectric member.

2. A tuning device as claimed in claim 1, wherein said fixing portion comprises a tube through which the fiber can pass, one end of the tube contacting the outside of the surround and the other end of the tube being for connection to the fiber.

3. A tuning device as claimed in claim 1, wherein each fixing portion is for fixing at least two optical fibers.

4. A tuning device as claimed in claim 3, wherein the two fixing portions are arranged such that the lengths of the portion of the first and second fibers are different.

5. A tuning device as claimed in claim 1, further comprising a second elongate piezoelectric member, said first and second member being arranged side-by-side and parallel to each other, both surrounded by the surround element.

6. A tuning device as claimed in claim 1, wherein two fibers can pass through each piezoelectric element, and wherein connections are provided for one fiber with one side of the surround and with one of the piezoelectric elements, and connections are provided for the other fiber with the other side of the surround and with the other of the piezoelectric elements.

7. A tuning device as claimed in claim 1, wherein the fixing portion is provided with a ferrule for attachment to the optical fiber, the ferrule having a narrow portion for engagement in an opening in the surround element, and wider portions on each side of the narrow portion which prevent movement of the ferrule through the opening.

8. A tuning device as claimed in claim 1, wherein the opening in the piezoelectric element comprises a slot.

9. A tuneable optical component comprising an optical fiber, having a length, and a tuning device for adjusting the length of the optical fiber, the tuning device comprising:
   a piezoelectric member having generally oppositely facing end faces and oppositely facing side faces extending between said end faces, and an element surrounding the piezoelectric member contacting with said end faces of said member but not contacting with said side faces of said member, wherein the optical fiber is fixed at a position along its length to the surround element at a point where said element is not in contact with said member, wherein the surround element has a width, perpendicular to the longitudinal axis of the piezoelectric member, and whereby the width of the surround element varies if the length of said piezoelectric member is varied and the resultant change in width of said surround element is greater than the change in length of said piezoelectric member.

10. A component as claimed in claim 9, further comprising a second fixing portion, wherein the fiber is fixed to opposite sides of the surround.

11. A component as claimed in claim 9 comprising at least two fibers, and wherein the tuning device further comprises a second elongate piezoelectric member and wherein said first and second members are arranged side-by-side and parallel to each other, both surrounded by the surround element.

12. A component as claimed in claim 11, wherein one of the fibers is connected to ore side of the surround arid to the first piezoelectric member, and the other one of the fibers is connected to the other side of the surround and to the second piezoelectric member.

13. A component as claimed in claim 9, wherein a Bragg grating is written into the fiber.

14. A component as claimed in claim 13, comprising a dispersion compensator.

15. A component as claimed in claim 13, comprising a tuneable fiber laser.

16. A component as claimed in claim 13, comprising a tuneable fiber filter, wherein the Bragg grating is tuned to allow the passage of selected wavelengths.

17. A tuning device as claimed in claim 1, wherein the piezoelectric member is provided with an opening for receiving an optical fiber, such that said fiber can pass transversely through the opening.

18. A tuning device as claimed in claim 17, further comprising a second fixing portion mounted on the surround element.

19. A tuning device as claimed in claim 5, wherein each piezoelectric member is provided with an opening for receiving an optical fiber, such that said fiber can pass transversely through the opening.

20. A method of tuning an optical component, said component comprising:

a piezoelectric member having generally oppositely facing end faces and oppositely facing side faces extending between said end faces, an element surrounding the piezoelectric member contacting with said end faces of said member but not contacting with said side faces of said member, and an optical fiber, having a length, fixed at a position along its length to the surround element at a point where said element is not in contact with said member, wherein the surround element has a width, perpendicular to the longitudinal axis of the piezoelectric member, and said method comprising applying control signals to said member, whereby the width of the surround element varies if the length of said piezoelectric member is varied and the resultant change in width of said surround element is greater than the change in length of said piezoelectric member.

* * * * *